United States Patent
Choi et al.

(10) Patent No.: US 9,742,254 B1
(45) Date of Patent: Aug. 22, 2017

(54) APPARATUS FOR GENERATING LINEAR VIBRATION WITH DAMPER AND DAMPER

(71) Applicant: JAHWA electronics Co., Ltd., Chungcheongbuk-do (KR)

(72) Inventors: Nam Jin Choi, Chungcheongbuk-do (KR); Kyung Hoon Jo, Chungcheongbuk-do (KR); Soon Koo Shim, Chungcheongbuk-do (KR); Young Bin Chong, Chungcheongbuk-do (KR); Won Gook Lee, Chungcheongbuk-do (KR); Min Goo Lee, Chungcheongbuk-do (KR)

(73) Assignee: JAHWA electronics Co., Ltd., Cheongju-si (KR)

( * ) Notice: Subject to any disclaimer, the term of this patent is extended or adjusted under 35 U.S.C. 154(b) by 0 days.

(21) Appl. No.: 15/347,922

(22) Filed: Nov. 10, 2016

(30) Foreign Application Priority Data

Aug. 18, 2016 (KR) ........................ 10-2016-0105078

(51) Int. Cl.
*H02K 33/00* (2006.01)
(52) U.S. Cl.
CPC .................. *H02K 33/00* (2013.01)
(58) Field of Classification Search
CPC ......... H02K 33/00–33/18; H02K 35/00–35/06
USPC .................................................. 310/15–39
See application file for complete search history.

(56) References Cited

U.S. PATENT DOCUMENTS

| 2010/0277010 A1* | 11/2010 | Jeon | H02K 33/18 310/25 |
| 2011/0193426 A1* | 8/2011 | Chung | H02K 33/16 310/25 |

FOREIGN PATENT DOCUMENTS

| JP | 2007-275695 A | 10/2007 |
| KR | 10-2007-0087523 A | 8/2007 |
| KR | 10-2015-0053104 A | 5/2015 |
| KR | 10-2015-0053106 A | 5/2015 |

OTHER PUBLICATIONS

Korean Notice of Allowance dated Jan. 3, 2017, in connection with corresponding KR Application No. 10-2016-0105078 (4 pgs., including English translation).

(Continued)

*Primary Examiner* — Thomas Truong
(74) *Attorney, Agent, or Firm* — Maier & Maier, PLLC

(57) ABSTRACT

Disclosed is an apparatus for generating linear vibration with a damper, which includes a housing having an inner space formed therein, a fixed body provided in the inner space and having a coil, a vibrating body having a magnet and a weight coaxially disposed with the coil and configured to move in a vertical direction on the basis of the fixed body, an elastic body configured to elastically support the vibrating body, a viscous fluid provided at an upper surface of the magnet and having viscosity, and a damper installed in the housing to face an upper surface of the vibrating body and configured to make a surface contact with the viscous fluid when the vibrating body moves upwards, the damper having a shape not making a surface contact with the entire viscous fluid simultaneously.

9 Claims, 8 Drawing Sheets

(56) References Cited

OTHER PUBLICATIONS

Korean Office Action dated Sep. 19, 2016, in connection with corresponding KR Application No. 10-2016-0105078 (11 pgs., including English translation).
Korean Office Action dated Nov. 19, 2016, in connection with corresponding KR Application No. 10-2016-0105078 (11 pgs., including English translation).

* cited by examiner

APPARATUS FOR GENERATING LINEAR VIBRATION WITH DAMPER AND DAMPER

TECHNICAL FIELD

The present disclosure relates to a damper and an apparatus for generating linear vibration with the damper, and more particularly, to an apparatus for generating linear vibration (hereinafter, also referred to as a linear vibration generating apparatus) capable of effectively preventing unnecessary noise generation and performance deterioration by improving a shape of a damper included in a linear vibration generating apparatus (or, a linear-vibrating motor) so that the damper does not simultaneously make a surface contact with front surfaces of a viscous fluid and a magnetic fluid, and a damper applied to the apparatus.

BACKGROUND ART

A mobile terminal such as a smart phone has a vibration function (or, a haptic function) for not only interfacing the receipt of a call but also interfacing for feeding back a key input, an occurrence of an event, execution of an application or the like to a user.

A vibration motor (or, a vibration generating apparatus) implementing such a vibration function converts energy obtained by an electromagnetic action into a vibration energy and is generally classified into a linear-type vibration motor and a flat/coin-type vibration motor depending on an operating way or pattern.

The flat/coin-type vibration motor has a behavior characteristic in which an inertia remains due to rotation, and thus a linear vibration generating apparatus having no rotation inertia is generally used when a rapid response speed is demanded.

An existing linear vibration generating apparatus (or, a linear-vibrating motor) 500 as described above includes a vibrating body 520 having a magnet 521 and a weight 523 surrounding an outer portion of the magnet 521, and an elastic body (e.g., a spring) 540 for physically supporting the vibrating body 520 in a vertical direction, as shown in FIG. 1.

In addition, as shown in FIG. 1, a fixed body 530 is located at a central axis provided to a middle portion of the linear vibration generating apparatus 500, and the fixed body 530 includes a yoke 533 and a coil 531 provided at the yoke 533 to generate an electromagnetic force to the magnet 521.

The linear vibration generating apparatus 500 is designed so that an electromagnetic force generated at the coil 531 and a physical elastic force provided by the elastic body 540 have resonance to each other. If a power of a specific frequency with a time-variant characteristic is applied to the coil 533 to generate an electromagnetic force, the generated electromagnetic force interacts with the elastic force of the elastic body 540 so that the vibrating body 520 makes a linear movement in a vertical direction. As shown in FIG. 1, the linear vibration generating apparatus 500 may further include a connection unit 570 and a circuit board 560 for interfacing with an external power or a control signal.

The existing linear vibration generating apparatus 500 includes a damper 550 for relieving a physical impact applied to a case or housing 510 which forms an inner space, and the damper 550 is provided at a location opposite to the magnet 521 to relieve or absorb an impact generated when the vibrating body 520 moves upwards, thereby minimizing the occurrence of unnecessary noise.

In this regard, a fluid-type damper having viscosity may also be used at the upper surface of the magnet 521 of the existing linear vibration generating apparatus 500, and in this case, a magnetic fluid (MF) 70 is frequently used as the fluid-type damper with viscosity in order to enhance a binding force. The magnetic fluid is formed by dispersing metal powder such as oxidized steel magnetized to a liquid base oil into a collide form, and a surfactant may also be added thereto depending on situations.

The magnetic fluid 70 has physical characteristics of fluid and thus more smoothly relieves a physical impact between components, and also the magnetic fluid 70 has magnetism to keep a fixed location without deviating from the location due to the magnetic force with the magnet 521.

The damper 550 is made of material such as rubber, silicon, foam rubber, Poron, foaming resin or the like in order to absorb an impact, and as shown in FIG. 2, the damper generally has a disk shape to include a shape corresponding to an outer circumferential portion of the magnet 521.

In order to absorb an impact and minimize the occurrence of unnecessary noise, the existing linear vibration generating apparatus 500 is used together with the damper 550 and the (magnetic fluid) viscous fluid 70, and it has been found as a result of experiments and observations that unexpected noise is generated from the linear vibration generating apparatus 500 used together with the damper 550 and the viscous fluid (magnetic fluid) 70.

The vibrating body 520 makes a linear movement in a vertical direction at a high speed due to the electromagnetic force generated at the coil 531 and the elastic force of the elastic body 540, and when the vibrating body 520 moves to a maximum upward displacement, the viscous fluid 70 provided at (or, applied to) the upper surface of the magnet 521 makes a surface contact with the damper 550. At this time, the viscous fluid 70 is entirely closely adhered to the lower surface of the damper 550 simultaneously as shown in a right part of FIG. 2. In the right part of FIG. 2, the portion A is a region where the viscous fluid 70 makes a surface contact with the damper 550.

The housing (case) may be made of metal material to shield an external magnetic force or the like, and thus the magnetic fluid 70 having magnetism due to the viscous fluid may form a magnetic force with respect to the housing. In addition, since the magnetic fluid 70 has physical characteristics of fluid (viscosity or the like), if the vibrating body 520 moves downwards, the magnetic fluid 70 closely adhered to the damper 550 and facing the damper 550 does not instantly move downwards together with the vibrating body 520 (specifically, the magnet) but keeps a state of being adhered to the damper 550, during an extremely short time or more.

In addition, if an existing damper is used, a space or gap is not present between the magnetic fluid 70 and the damper 550, and thus the magnetic fluid 70 makes a surface contact with the damper 550 as a whole so that an interface of the magnetic fluid 70 and the damper 550 is perfectly sealed.

Due to this phenomenon, while the vibrating body 520 moves downwards, the magnetic fluid 70 may form a pillar-like shape with which a center portion of the magnetic fluid 70 gradually narrows as shown in FIG. 3, or while the vibrating body 520 moves to a maximum downward displacement, the center portion of this fluid pillar may be fractured. During this process, unnecessary noise is generated.

In addition, the magnetic fluid 70 facing the damper 550 is adhered to the damper 550 for a predetermined time, and while the vibrating body 520 moves down to a maximum displacement, a downward pulling force gradually increases, and the sealed interface of the magnetic fluid 70 is separated, thereby causing unnecessary noise.

DISCLOSURE

Technical Problem

The present disclosure is designed to solve the problems of the related art, and therefore the present disclosure is directed to providing a damper with an improved shape structure, which may minimize noise generated when a magnetic fluid (or, a viscous fluid) facing the damper is separated, by sealing or closely adhering the viscous fluid or the magnetic fluid as a whole and thus guiding the viscous fluid or the magnetic fluid not to make a surface contact with the damper, and also directed to providing an apparatus for generating linear vibration, which includes the damper.

Technical Solution

In one aspect of the present disclosure, there is provided an apparatus for generating linear vibration with a damper, comprising: a housing having an inner space formed therein; a fixed body provided in the inner space and having a coil; a vibrating body having a magnet and a weight coaxially disposed with the coil and configured to move in a vertical direction on the basis of the fixed body; an elastic body configured to elastically support the vibrating body; a viscous fluid provided at an upper surface of the magnet and having viscosity; and a damper installed in the housing to face an upper surface of the vibrating body and configured to make a surface contact with the viscous fluid when the vibrating body moves upwards, the damper having a shape not making a surface contact with the entire viscous fluid simultaneously. In this case, the viscous fluid may be a magnetic fluid.

In addition, the damper of the present disclosure may have a surface-contact part making a surface contact with the viscous fluid and one or more space not making a surface contact with the viscous fluid, which are simultaneously formed in a region corresponding to the viscous fluid, and the damper may be shaped symmetrically on the basis of a center portion thereof.

Further, the damper of the present disclosure may be configured so that a distance from a center portion thereof to an outermost portion thereof is greater than a distance from a central axis of the magnet to an outer circumference of the magnet.

In order to implement an embodiment, the damper of the present disclosure may have two or more protrusions shaped radially or symmetrically on the basis of a center portion thereof, and the damper of the present disclosure may have one or more grooves formed at a location corresponding to the viscous fluid.

In addition, the damper of the present disclosure may have at least one convex portion and at least one concave portion repeatedly formed at an outer circumference thereof.

In another aspect of the present disclosure, there is also provided a damper for at an apparatus for generating linear vibration which includes a housing having an inner space formed therein, a fixed body provided in the inner space and having a coil, a vibrating body having a magnet and a weight coaxially disposed with the coil and configured to move in a vertical direction on the basis of the fixed body, an elastic body configured to elastically support the vibrating body, and a viscous fluid provided at an upper surface of the magnet and having viscosity, wherein the damper is installed in the housing to face an upper surface of the vibrating body and configured to make a surface contact with the viscous fluid when the vibrating body moves upwards, and the damper has a shape not making a surface contact with the entire viscous fluid simultaneously.

Advantageous Effects

The damper according to the present disclosure and the apparatus for generating linear vibration with the damper reduces the occurrence of noise by relieving an impact applied to a vibrating body by means of a buffering means, and further improves a shape structure of the damper so that the damper does not make a surface contact with the viscous fluid or the magnetic fluid provided at the vibrating body as a whole but just make a surface contact therewith partially, thereby fundamentally preventing the occurrence of noise generated by repeated detachment or separation phenomenon at which the magnetic fluid (or, the viscous fluid) adhered to the damper as a whole is separated therefrom.

In addition, according to another embodiment of the present disclosure, a width of the damper on the basis of a horizontal section is expanded to a weight range of the vibrating body, thereby further reducing the collision of an outer circumferential portion of the vibrating body to a housing while the vibrating body moves in a vertical direction at a high speed.

Further, according to another embodiment of the present disclosure, the structure of the damper is improved to be symmetrical on the basis of a center portion thereof, thereby physically relieving an impact of the vibrating body in all directions and thus minimizing the generation of resultant noise.

DETAILED DESCRIPTION

Figure 4:
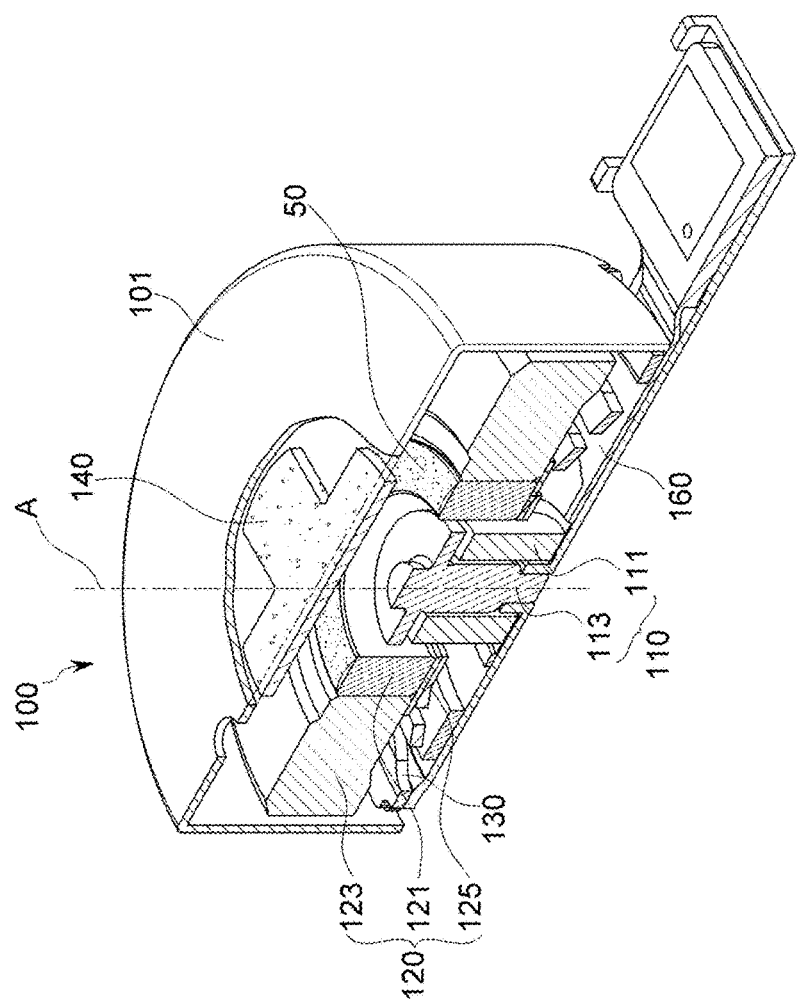
FIG. 4 is a diagram showing an apparatus for generating linear vibration with a damper according to a preferred embodiment of the present disclosure.

FIG. 4 is a diagram showing an apparatus for generating linear vibration (hereinafter, also referred to as a 'linear vibration generating apparatus') 100 with a damper according to a preferred embodiment of the present disclosure.

As shown in FIG. 4 a linear vibration generating apparatus 100 according to the present disclosure may include a housing 101, a magnet 121, a weight 123, a coil 111, a yoke 113, an elastic body 130, a damper 140, and a bracket 160.

The housing 110 of the present disclosure is provided at an upper portion of the bracket 160 and corresponds to a case of the linear vibration generating apparatus 100 according to the present disclosure along with the bracket 160. Also, as shown in the figure, the housing 11 forms an inner space for other components of the present disclosure.

The fixed body 110 of the present disclosure which is also called a stator is a component corresponding to a vibrating body 120, explained later, and includes a coil for generating an electromagnetic force for the linear movement of the vibrating body 120 by means of an interaction with the vibrating body 120, more specifically a magnet 121 provided at the vibrating body 120. In view of the fixed body 110, an object making a linear movement is called a vibrating body 120, a moving body, an oscillator or the like.

The fixed body 110 includes a yoke 113 and a coil 111, and the coil 111 generates a magnetic force to the magnet 121 by means of an applied power. The coil 111 may be located at a center portion of the inner space provided in the housing in order to enhance an interaction of the electromagnetic force and the efficiency in linear vibration (movement).

Depending on embodiments, the coil 111 may have a hollow formed at a center portion thereof, and the yoke 113 may be provided at the hollow. In other words, the coil 111 may be provided to surround the yoke 113.

The yoke 113 is press-fit or inserted into the bracket 160 and detachably fixed to the bracket 160, and the yoke 113 is located at a center portion of the linear vibration generating apparatus 100 according to the present disclosure.

The yoke 113 may be made of metal material or the like with magnetism in order to focus concentrate a magnetic force and prevent leakage of a magnetic field, and also serve as a guide for protecting a top of the coil 111 and position the coil 111 accurately. The coil 111 and the yoke 113 may be positioned on the basis of the same central axis (A in FIG. 4).

The vibrating body 120 of the present disclosure may include a magnet 121, a weight 123 and a plate 125. The magnet 121 implemented using a permanent magnet is a component corresponding to the coil 111, explained above, and makes a linear movement in a vertical direction on the basis of the fixed body 110 by means of an electromagnetic force generated by the coil 111, and accordingly the vibrating body 120 including a weight 123 or the like connected to the magnet 121 moves in a vertical direction.

For more effective concentration of the electromagnetic force and more effective movement in a vertical direction, the magnet 121 may have a hole formed at a center portion thereof like a donut or track shape to surround an outer circumference of the coil 111. Even in this case, the central axis of the magnet 121 may be coaxial with the central axis (A) of the coil 111 and the yoke 113, explained above.

The weight 123 is loaded on an upper surface of the plate 125 together with the magnet 121 to enhance vibration deviation caused by vertical movement.

As shown in the figures, the vibrating body 120 described above is connected to the elastic body 130 and thus guided to move in a vertical direction, and the elastic body 130 is designed with specific weight, Young's modulus, length or the like to have mutual resonance with the electromagnetic force provided to the vibrating body 120.

A viscosity fluid, namely a fluid with viscosity, is provided as a kind of fluid damper at an upper portion or upper surface of the magnet 121 of the vibrating body 120 in order to effectively prevent an interference or collision with other components.

Depending on embodiments, the viscous fluid may be implemented with a magnetic fluid 50 (MF) whose location may be continuously maintained by means of a magnetic force of the magnet 121, so that the location of the viscous fluid may be maintained consistently. Hereinafter, a magnetic fluid, which is an example of the viscous fluid, will be described for the convenience of explanation.

The magnetic fluid 50 may be applied to the upper surface of the magnet 121 in a dot pattern, but in order to effectively absorb an impact, the magnetic fluid 50 may be applied to the upper surface of the magnet 121 in a kind of ring shape along the donut or track shape of the magnet 121.

The damper 140 of the present disclosure is installed at an upper portion of the housing 101 to face an upper portion or upper surface of the vibrating body 120. As described above, the damper 140 is a cushion member for relieving a physical impact of the vibrating body 120 and may made of material such as rubber, silicon, foam rubber, Poron, foaming resin or the like in order to absorb an impact or collision.

If the vibrating body 120 moves upwards toward a maximum displacement by means of the electromagnetic force of the coil 111 and the magnet 121, the damper 140 of the present disclosure makes a surface contact with the magnetic fluid 50 provided at the upper surface of the magnet 121.

At this time, the damper 140 of the present disclosure makes a surface contact with the magnetic fluid like an existing damper which is sealed as making a surface contact with the magnetic fluid as a whole, and also, in order to effectively solve separation (breakaway or deviation) of the magnetic fluid, as shown in the figures, the damper 140 is shaped not to make a surface contact with the entire magnetic fluid 50. In other words, as explained later, the damper 140 of the present disclosure does not make a surface contact with the entire magnetic fluid 50 simultaneously but makes a surface contact just discontinuously or partially at the same time.

Figure 5:
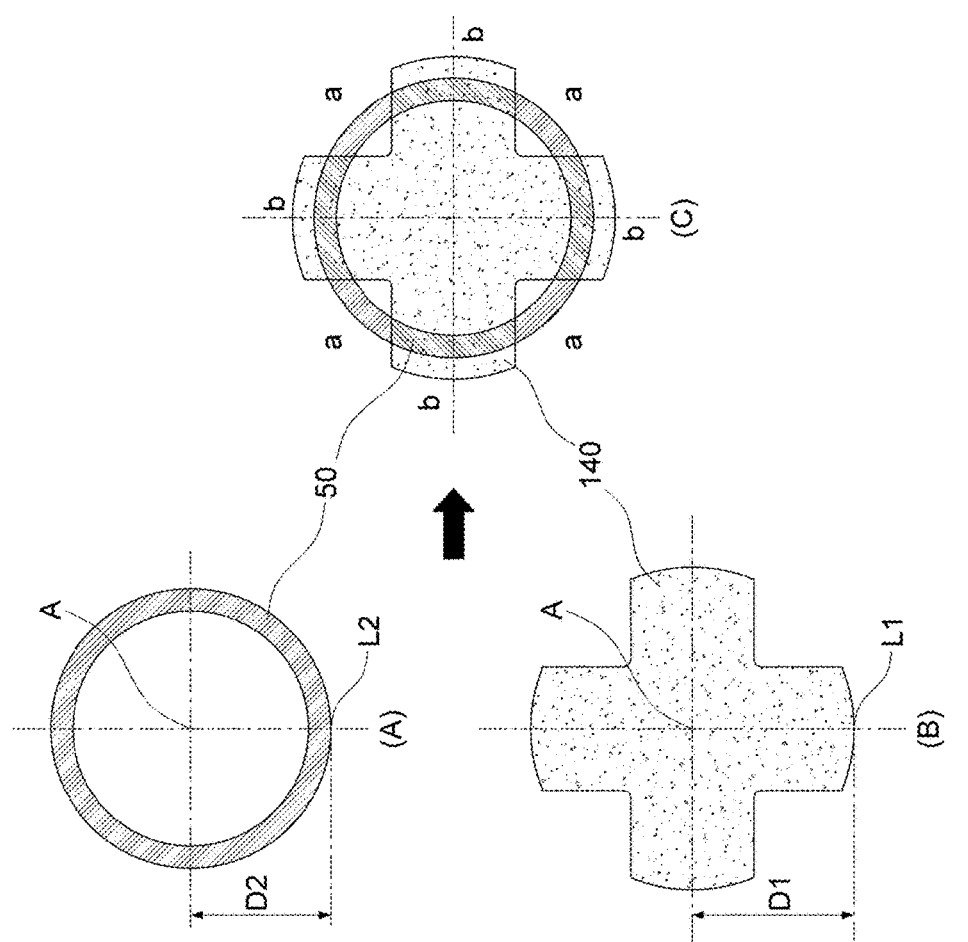
FIG. 5 is a diagram showing a relation between the damper according to a preferred embodiment of the present disclosure and a magnetic fluid.

Referring to FIG. 5 or the like, the shape and structure of the damper 140 according to the present disclosure will be described as follows.

(A) FIG. 5 shows a shape of the magnetic fluid 50 applied to the upper surface of the magnet 121, and (B) of FIG. 5 shows a single sectional shape on the basis of a horizontal side of the damper 140 according to an embodiment of the present disclosure. Since the magnetic fluid 50 is provided at the upper surface of the magnet 121, the shape in (A) of FIG. 5 is substantially identical to the sectional shape on the basis of the horizontal side of the magnet 121.

As shown in FIG. 5, the damper 140 of the present disclosure may be shaped symmetrically on the basis of a center portion thereof in order to relieve or absorb a physical impact with the vibrating body 120 in all directions.

In addition, if the damper has a size corresponding to the magnet as in an existing technique, a collision between the vibrating body and the magnet may be reduced, but it may not be impossible to effectively prevent the weight located out of the magnet from colliding with an upper portion of the housing.

Therefore, the damper 140 of the present disclosure may be configured so that a distance from the center portion to an outermost portion thereof is expanded to a portion out of the outer diameter of the magnet 121. In other words, the damper 140 of the present disclosure may be implemented so that a distance D1 from the center portion A to the outermost portion L1 is greater than a distance D2 from the center (A in FIG. 5) to the outer circumference L2 of the magnet 121.

Figure 1:
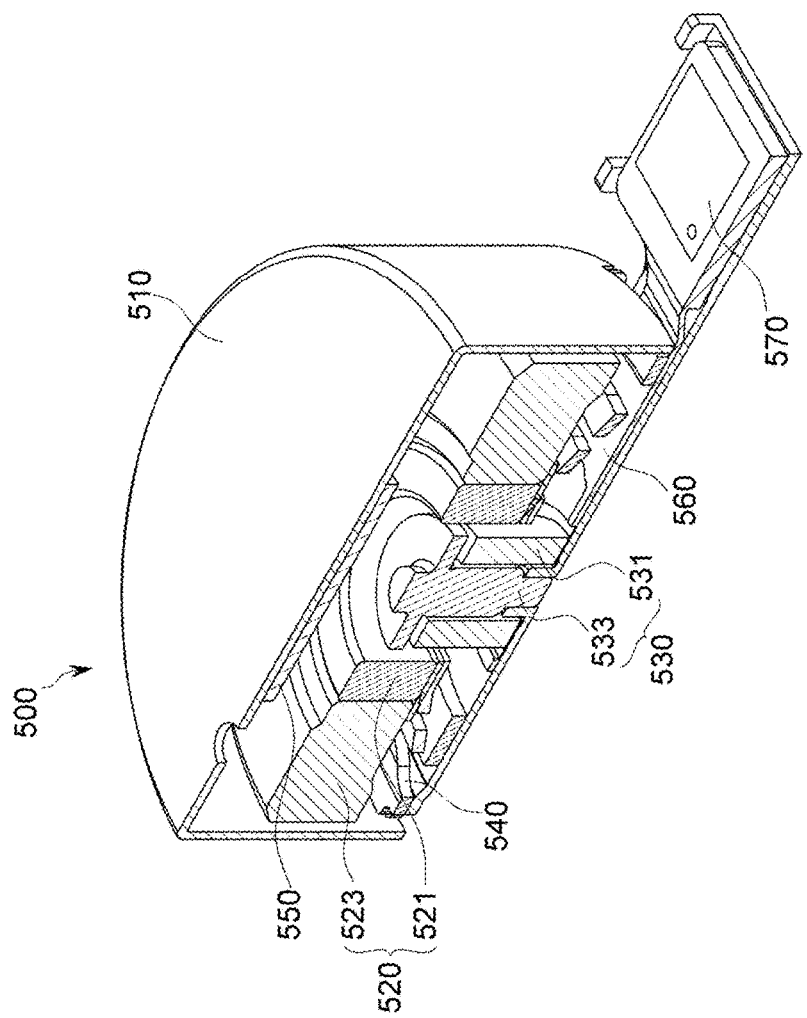
FIG. 1 is a diagram showing a configuration of an existing linear vibration generating apparatus.
Figure 2:
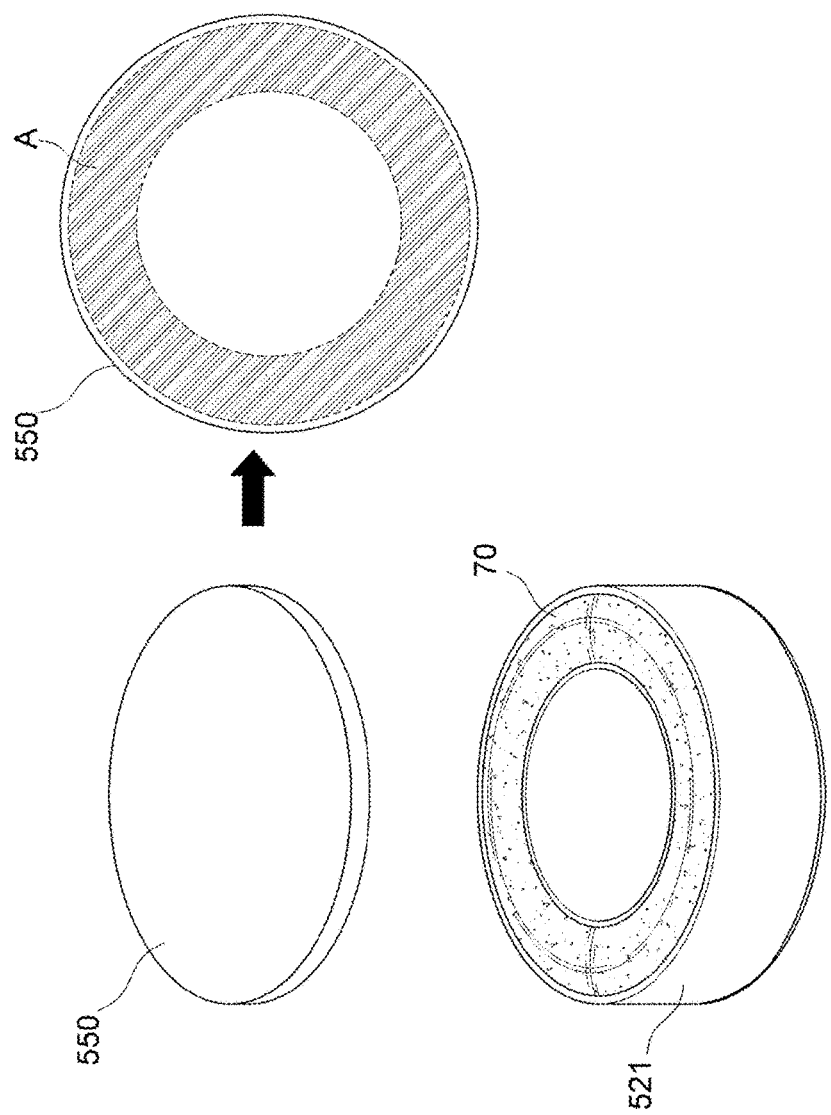
FIG. 2 is a diagram showing that a damper of the existing linear vibration generating apparatus makes a surface contact with a magnetic fluid.
Figure 3:
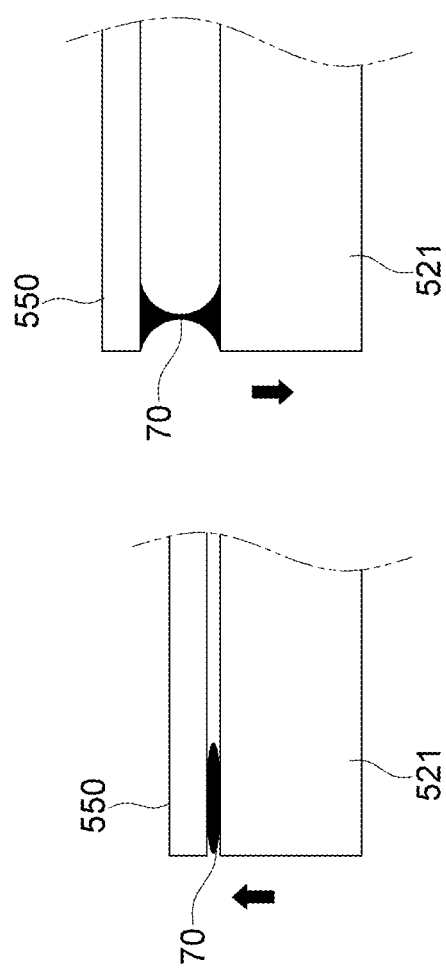
FIG. 3 is a diagram showing that a fluid pillar is formed by means of the magnetic fluid at the existing linear vibration generating apparatus.

In this configuration, the magnetic fluid 50 makes a surface contact with the damper 140 of the present disclosure but does not make a contact with the entire magnetic fluid 50 at the same time, and thus the magnetic fluid 50 is not sealed by the damper 140, which means that the magnetic fluid 50 just makes a partial surface contact with the damper 140. Therefore, the magnetic fluid 50 may be easily separated from the damper 140, and when the vibrating body 120 moves downwards, it is possible to prevent or reduce that a fluid pillar as shown in FIG. 3 is created.

As shown in (C) of FIG. 5, the damper 140 of the present disclosure has a surface-contact part (b) making a surface contact with the magnetic fluid 50 and one or more space (a) not making a surface contact with the magnetic fluid 50, which are formed together. Thus, even though the magnetic fluid 50 makes a surface contact with the damper 140, it is possible to guide the magnetic fluid 50 not to be sealed, thereby effectively solving the problems of the existing technique caused when the magnetic fluid 50 is sealed due to a surface contact.

Hereinafter, various embodiments of the damper 140 implementing the technical features of the present disclosure will be described with reference to FIG. 6. The embodiments of the present disclosure described below are examples illustrating the technical features of the present disclosure, and various modifications can be made in addition to the examples depicted in FIG. 6 as long as the magnetic fluid 50 does not make a surface contact entirely with the damper 140 at the same time.

Figure 6:
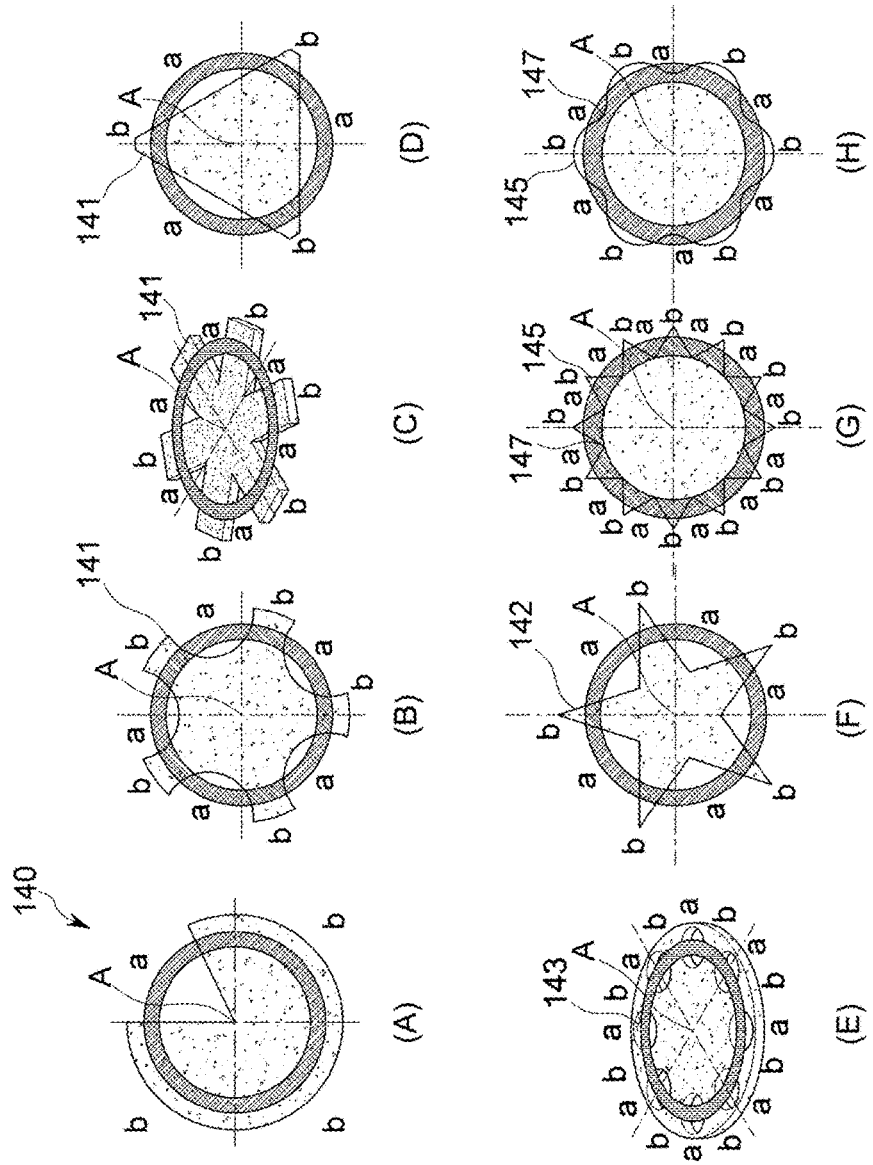
FIG. 6 is a plane or perspective view showing dampers according to other embodiments of the present disclosure and also showing that these dampers make a surface contact with a magnetic fluid.

As shown in FIG. 6, the damper 140 of the present disclosure is shaped to physically support the magnet 121 and the weight 123 of the vibrating body 120 and not to simultaneously make a surface contact with the entire magnetic fluid 50 applied to or provided at the upper surface of the magnet 121.

In detail, as shown in FIG. 6, the damper 140 of the present disclosure may be shaped to have two or more protrusions 141 which extend outwards from a center portion (A in FIG. 6) in a radial or symmetric pattern.

In (A) of FIG. 6, a region (b) (a surface-contact part) making a surface contact with the magnetic fluid 50 and a space (a) not making a surface contact with the magnetic fluid 50 are provided together, even though they are not symmetrical. Thus, the damper 140 does not make a surface contact with the entire magnetic fluid 50 at the same time.

Also, as shown in (E) of FIG. 6, one or more grooves 143 may be provided at a location corresponding to the magnetic fluid 50, at an inner side of the damper 140. In this case, at the groove 143, the damper 140 of the present disclosure does not make a direct surface contact with the magnetic fluid 50 or does not make a surface contact with another surface-contact part (b) simultaneously, thereby solving the problem of the existing technique.

In addition, the damper 140 of the present disclosure may be shaped so that its outer circumference has a convex portion 145 and a concave portion 147 repeatedly formed as shown in (G) and (H) of FIG. 6, and a portion (b) making a surface contact with the magnetic fluid and a portion (a) not making a surface contact with the magnetic fluid may be alternately formed by means of the convex portion 145 and the concave portion 147.

In (G) and (H) of FIG. 6, it is depicted that the convex portion 145 and the concave portion 147 are repeatedly formed at the entire area so that the damper 140 may physically support the vibrating body 120 more effectively in all directions. However, depending on embodiments, the convex portion 145 and the concave portion 147 may be formed just once, respectively, or they may also be repeatedly formed just partially.

In this case, depending on embodiments, the convex portion 145 of the damper 140 may be located more outwards on the basis of the location of the magnetic fluid 50, namely at a location where the weight 123 is provided, and the concave portion 147 of the damper may be located corresponding to a location of the magnetic fluid 50 or more inwards based on the location of the magnetic fluid 50.

In addition, since the damper 140 of the present disclosure is designed not to make a contact with the entire surface of the magnetic fluid 50 so that the damper 140 does not seal the magnetic fluid 50 and thus the problems of the existing technique are solved in this way, various structures such as a stepped structure or a protruding structure may also be used in addition to the depicted structures so that the damper 140 does not make a surface contact with the entire magnetic fluid 50 simultaneously.

Figure 7:
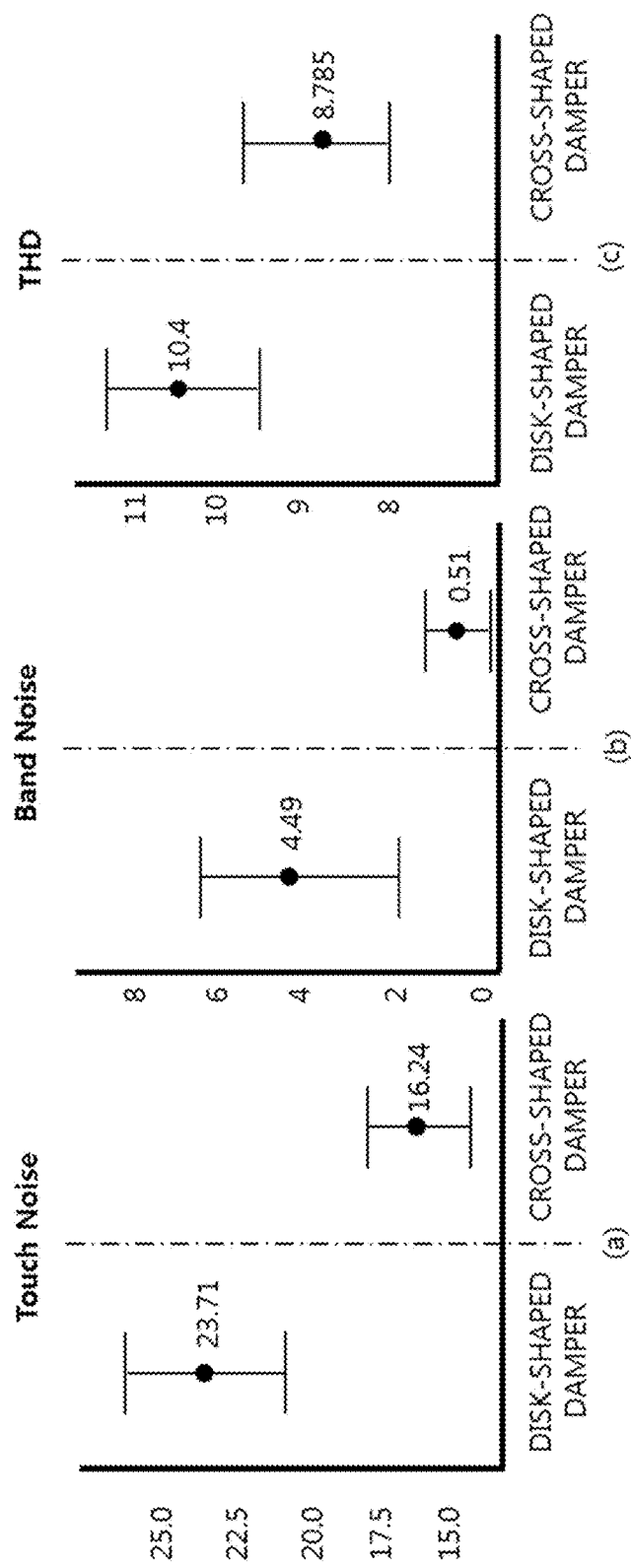
FIG. 7 is a diagram for comparing noise-related data between a cross-shaped damper according to an embodiment of the present disclosure and an existing disk-shaped damper.
Figure 8:
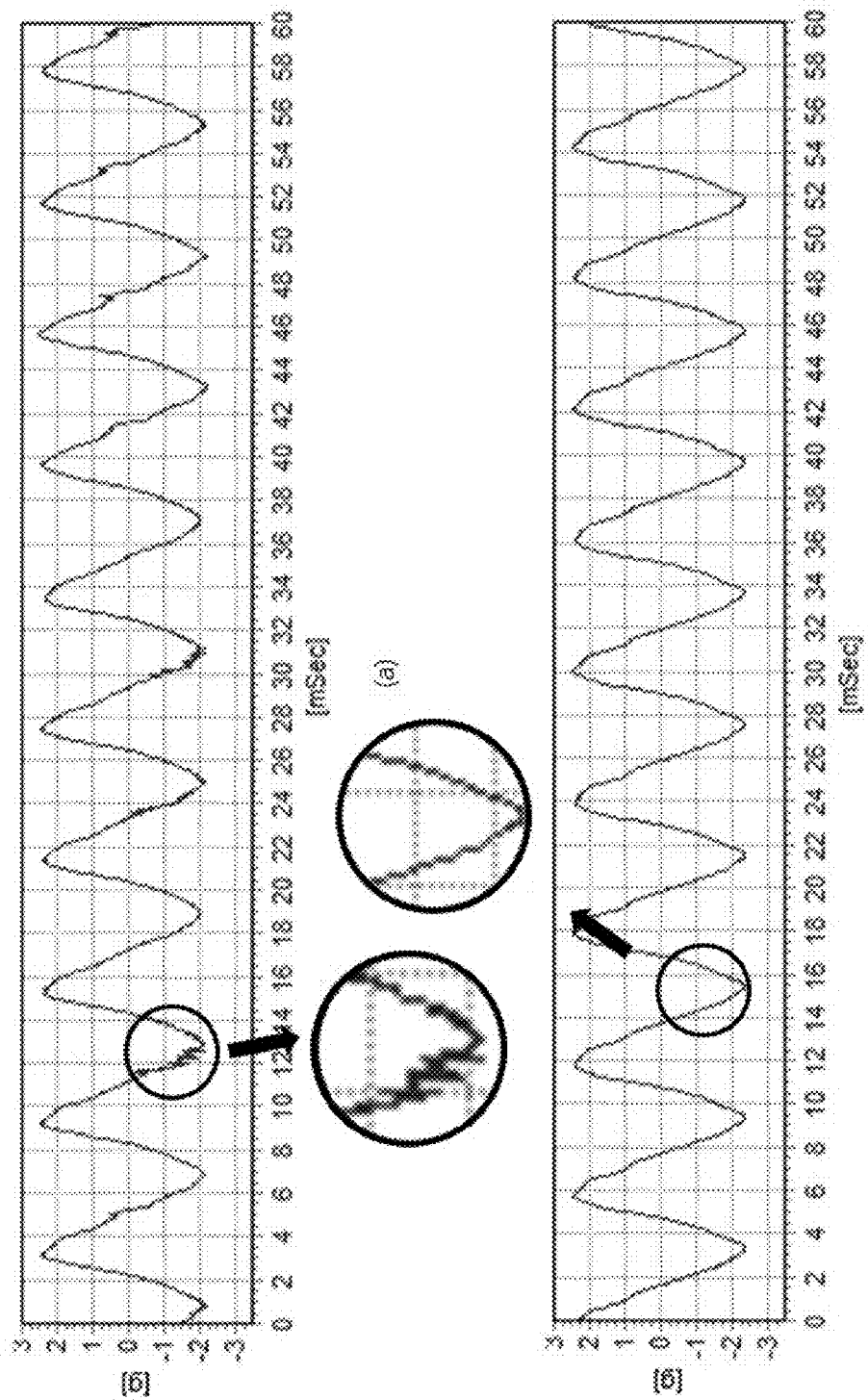
FIG. 8 is a diagram for comparing noise-related data between a cross-shaped damper according to an embodiment of the present disclosure and an existing disk-shaped damper.

FIGS. 7 and 8 are diagrams for comparing noise-related data between the cross-shaped damper 140 according to an embodiment of the present disclosure and an existing disk-shaped damper 550.

In this comparative experiment, the cross-shaped damper 140 according to an embodiment of the present disclosure and the existing disk-shaped damper 550 have the same specification with an outer diameter of 4.8Ø and a thickness of 0.2 mm and are made of the same rubber material. Other components such as a weight and a coil are identically configured. In addition, noise-related values are analyzed using BK2120C produced by BaKo Co., Ltd.

As shown in FIG. 7, it may be found that the cross-shaped damper 140 of the present disclosure is improved in comparison to the existing disk-shaped damper 550 in terms of all of touch noise, band noise and THD (Total Harmonic Distortion).

In detail, in case of the touch noise, it is checked that the existing disk-shaped damper 550 has a distribution of 21 dB to 26 dB and an average of 23.71 dB, but the cross-shaped damper 140 of the present disclosure shows a distribution of 14.8 dB to 17.6 dB and an average of 16.24 dB. In other words, it may be understood that according to the embodiment of the present disclosure, the deviation of touch noise is reduced and also the touch noise is decreased as a whole.

In case of the band noise, the existing disk-shaped damper 550 has an average of 4.49 dB, but the cross-shaped damper 140 of the present disclosure has an average of 0.51 dB, greatly lower that the existing technique, and thus it may be understood that the damper 140 of the present disclosure is greatly improved in terms of the band noise.

In case of the THD, the average is lowered as much as 10.4% to 8.785%, and thus it may be found that the cross-shaped damper 140 of the present disclosure has improved performance in comparison to the existing disk-shaped damper 550.

FIG. 8 is a diagram for comparing waveforms of the cross-shaped damper 140 according to an embodiment of the present disclosure and the existing disk-shaped damper 550 ≙ the present disclosure. As shown in (a) of FIG. 8, the existing disk-shaped damper 550 contain much noise components in the waveform, but it may be found that the cross-shaped damper 140 of the present disclosure has substantially no noise in the waveform in comparison to the existing disk-shaped damper 550 as shown in (b) of FIG. 8 (b).

| Reference Symbols | |
|---|---|
| 100: apparatus for generating linear vibration | 50: magnetic fluid |
| 101: housing | 110: fixed body |
| 111: coil | 113: yoke |
| 120: vibrating body | 121: magnet |
| 123: weight | 125: plate |
| 130: elastic body | 140: damper |
| 141: protrusion | 143: groove |
| 145: convex portion | 147: concave portion |
| 160: bracket | |

What is claimed is:

1. An apparatus for generating linear vibration with a damper, comprising:
    a housing having an inner space formed therein;
    a fixed body provided in the inner space and having a coil;
    a vibrating body having a magnet and a weight coaxially disposed with the coil and configured to move in a vertical direction on the basis of the fixed body;
    an elastic body configured to elastically support the vibrating body;
    a viscous fluid provided at an upper surface of the magnet and having viscosity;
    a damper installed in the housing to face an upper surface of the vibrating body and configured to make a surface contact with the viscous fluid when the vibrating body moves upwards, the damper having a shape not making a surface contact with the entire viscous fluid simultaneously, and
    the damper has a surface-contact part making a surface contact with the viscous fluid and one or more spaces not making a surface contact with the viscous fluid, which are simultaneously formed in a region corresponding to the viscous fluid.

2. The apparatus for generating linear vibration with a damper according to claim 1,
    wherein the viscous fluid is a magnetic fluid.

3. The apparatus for generating linear vibration with a damper according to claim 1,
    wherein the damper is shaped symmetrically on the basis of a center portion thereof.

4. The apparatus for generating linear vibration with a damper according to claim 1,
    wherein the damper is configured so that a distance from a center portion thereof to an outermost portion thereof is greater than a distance from a central axis of the magnet to an outer circumference of the magnet.

5. The apparatus for generating linear vibration with a damper according to claim 1,
    wherein the damper has two or more protrusions shaped radially or symmetrically on the basis of a center portion thereof.

6. The apparatus for generating linear vibration with a damper according to claim 1,
    wherein the damper has one or more grooves formed at a location corresponding to the viscous fluid.

7. The apparatus for generating linear vibration with a damper according to claim 1,
    wherein the damper has at least one convex portion and at least one concave portion repeatedly formed at an outer circumference thereof.

8. A damper for an apparatus for generating linear vibration, comprising:
    a housing having an inner space formed therein, a fixed body provided in the inner space and having a coil, a vibrating body having a magnet and a weight coaxially disposed with the coil and configured to move in a vertical direction on the basis of the fixed body, an elastic body configured to elastically support the vibrating body, and a viscous fluid provided at an upper surface of the magnet and having viscosity,
    wherein the damper is installed in the housing to face an upper surface of the vibrating body and configured to make a surface contact with the viscous fluid when the vibrating body moves upwards, and the damper has a shape not making a surface contact with the entire viscous fluid simultaneously, and
    the damper has a surface-contact part making a surface contact with the viscous fluid and one or more spaces not making a surface contact with the viscous fluid, which are simultaneously formed in a region corresponding to the viscous fluid.

9. The damper for at an apparatus for generating linear vibration according to claim 8,
    wherein the damper has two or more protrusions shaped radially or symmetrically on the basis of a center portion thereof.

* * * * *